United States Patent
Karr et al.

(10) Patent No.: US 8,285,965 B2
(45) Date of Patent: Oct. 9, 2012

(54) ALIGNING DATA STORAGE DEVICE PARTITION TO BOUNDARY OF PHYSICAL DATA SECTOR

(75) Inventors: Christopher P. Karr, Lake Forest, CA (US); Theodore E. Deffenbaugh, Coto De Caza, CA (US); Todd D. Yogi, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 348 days.

(21) Appl. No.: 12/623,370

(22) Filed: Nov. 20, 2009

(65) Prior Publication Data

US 2011/0125977 A1    May 26, 2011

(51) Int. Cl.
*G06F 12/00* (2006.01)
(52) U.S. Cl. ............................................. 711/173
(58) Field of Classification Search .............. None
See application file for complete search history.

(56) References Cited

U.S. PATENT DOCUMENTS

| | | | |
|---|---|---|---|
| 5,325,526 A | 6/1994 | Cameron et al. | |
| 5,613,066 A | 3/1997 | Matsushima et al. | |
| 5,675,769 A | 10/1997 | Ruff et al. | |
| 5,813,025 A | 9/1998 | Murphy et al. | |
| 5,822,142 A | 10/1998 | Hicken | |
| 6,035,351 A | 3/2000 | Billings et al. | |
| 6,092,231 A | 7/2000 | Sze | |
| 6,112,277 A | 8/2000 | Bui et al. | |
| 6,175,686 B1 | 1/2001 | Noda | |
| 6,185,666 B1 | 2/2001 | Murray et al. | |
| 6,191,712 B1 * | 2/2001 | Still | 341/95 |
| 6,324,604 B1 | 11/2001 | Don et al. | |
| 6,385,711 B1 | 5/2002 | Colligan | |
| 6,453,383 B1 | 9/2002 | Stoddard et al. | |
| 6,532,517 B1 | 3/2003 | Wagner et al. | |
| RE38,502 E | 4/2004 | Yonemitsu | |
| 6,751,686 B2 | 6/2004 | Takasugi et al. | |
| 6,988,178 B1 | 1/2006 | Shirai et al. | |
| 7,076,603 B1 | 7/2006 | Chheda | |
| 7,099,993 B2 | 8/2006 | Keeler | |
| 7,330,117 B2 | 2/2008 | Ferguson et al. | |
| 7,330,417 B2 | 2/2008 | Billau et al. | |
| 7,461,202 B2 | 12/2008 | Forrer, Jr. et al. | |
| 7,539,924 B1 | 5/2009 | Vasquez et al. | |
| 7,574,558 B2 | 8/2009 | Morley et al. | |
| 8,006,027 B1 | 8/2011 | Stevens et al. | |

(Continued)

OTHER PUBLICATIONS

Scott Errington, "OS and Application Considerations for Hard Disc Drives With Long Physical Sector Sizes", http://bigsector.net/user_img/Long_Physical_Sector_Sizes_PDF_version_02.pdf.

(Continued)

*Primary Examiner* — Hiep Nguyen

(57) ABSTRACT

A method of aligning a partition of a data storage device to a boundary of a physical data sector is disclosed. The data storage device comprises a non-volatile memory comprising a plurality of physical data sectors, wherein each physical data sector comprises a plurality of logical data sectors. A partition map is read from the non-volatile memory, wherein the partition map identifies a partition comprising a number of logical data sectors. A number of logical data sectors in each physical data sector is determined. Whether at least part of the partition aligns with a boundary of a physical data sector is determined. When at least part of the partition does not align with a boundary of a physical data sector, at least part of the partition is moved to align at least part of the partition to a boundary of a physical data sector.

33 Claims, 7 Drawing Sheets

U.S. PATENT DOCUMENTS

| | | | | |
|---|---|---|---|---|
| 8,046,533 | B2 * | 10/2011 | Kompella et al. | 711/112 |
| 8,055,842 | B1 * | 11/2011 | Iyer | 711/114 |
| 2004/0019718 | A1 | 1/2004 | Schauer et al. | |
| 2004/0255093 | A1 | 12/2004 | Forrer, Jr. et al. | |
| 2005/0036381 | A1 | 2/2005 | Hassner et al. | |
| 2007/0192533 | A1 | 8/2007 | Kim et al. | |
| 2008/0028162 | A1 | 1/2008 | Thompson | |
| 2009/0313426 | A1 | 12/2009 | See et al. | |
| 2010/0232049 | A1 | 9/2010 | Kompella et al. | |

OTHER PUBLICATIONS

International Search Report and Written Opinion dated Jan. 27, 2011 for PCT Application No. PCT/US2010/056678, 7 pages.

"Seagate," "Advanced Format 4K Sector Transition"", May 2010, http://www.seagate.com/docs/pdf/whitepaper/mb604_4k_transition_faq.pdf".

Incits, "AT Attachment 8—ATA/ATAPI Command Set (ATA8-ACS)", Revision 4a, May 21, 2007, American National Standards Institute, New York, New York, United States.

Incits, "AT Attachment with Packet Interface—7 vol. 1—Register Delivered Command Set, Logical Register Set (ATA/ATAPI-7 V1)", Revision 4b, Apr. 21, 2004, American National Standards Institute, New York, New York, United States.

Incits, "SCSI Block Commands—3 (SBC-3)", Revision 16, Aug. 25, 2008, American National Standards Institute, New York, New York, United States.

* cited by examiner

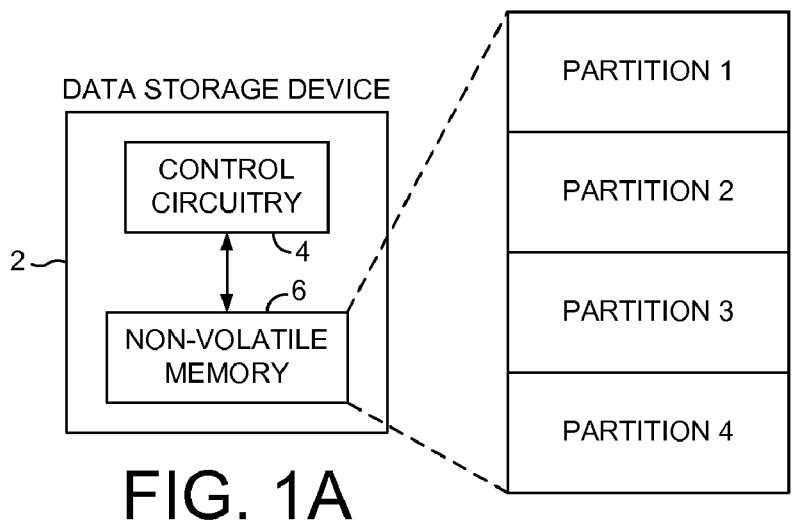
FIG. 1A
(Prior Art)
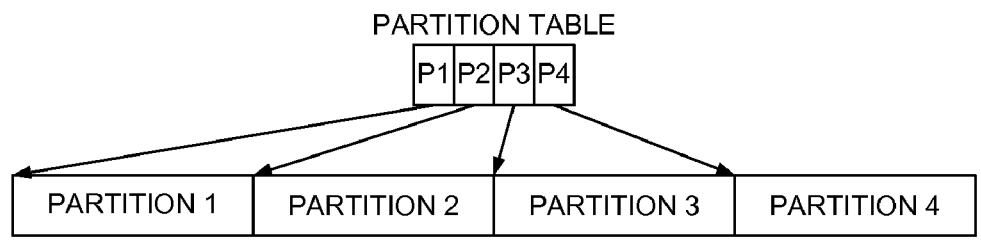
FIG. 1B
(Prior Art)
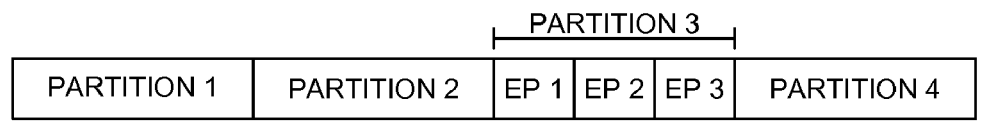
FIG. 1C
(Prior Art)
FIG. 1D
(Prior Art)
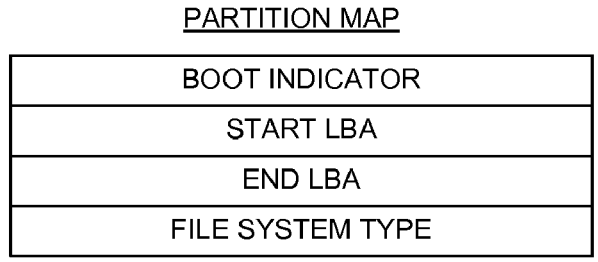

ALIGNING DATA STORAGE DEVICE PARTITION TO BOUNDARY OF PHYSICAL DATA SECTOR

BACKGROUND

FIG. 1A shows a data storage device 2 (e.g., a disk drive or a solid state drive) comprising control circuitry 4 and a non-volatile memory 6, such as a disk or a flash memory. The non-volatile memory 6 comprises a plurality of memory segments referred to as physical data sectors. To facilitate defect mapping, the physical data sectors are accessed indirectly through logical block addresses (LBAs). In this manner, if a physical data sector degrades, the system/user data can be relocated to a spare data sector and the corresponding LBA(s) remapped to the spare data sector.

The non-volatile memory 6 comprises a predetermined number of usable physical data sectors and corresponding LBAs (i.e., there is a maximum LBA). The LBAs may be divided into a number of partitions, wherein each partition stores a file system (e.g., a n-bit FAT file system, or a NT File System) identifying system files and user files. A partition may be bootable meaning that it stores a bootable operating system (OS) such as Windows OS or Mac OS. When a computer system is initially powered on, a master boot record (MBR) is read from the data storage device (typically stored in the first logical data sector). The MBR identifies a partition table that stores a partition map for each partition of the data storage device as illustrated in FIG. 1B. The partition table typically includes up to four primary partition maps identifying up to four primary partitions, wherein a primary partition may be further subdivided into extended partitions as illustrated in FIG. 1C. Each partition map (primary and extended) identifies a starting LBA and ending LBA of the corresponding partition, a file system type field, and a flag indicating whether the partition is bootable as shown in FIG. 1D. When the computer system finds a bootable partition, it uses the file system type field to access the partition's file system in order to read and execute the OS files from the partition (i.e., boot the computer system).

BRIEF DESCRIPTION OF THE DRAWINGS

FIG. 1A shows a prior art data storage device comprising control circuitry and a non-volatile memory comprising a plurality of partitions.

FIG. 1B shows a prior art partition table comprising a number of partition maps.

FIG. 1C shows a prior art partition subdivided into a number of extended partitions.

FIG. 1D shows a prior art partition map identifying a starting LBA and ending LBA for the partition, a file system type field, and a flag indicating whether the partition is bootable.

DETAILED DESCRIPTION OF EMBODIMENTS OF THE INVENTION

Figure 2A:
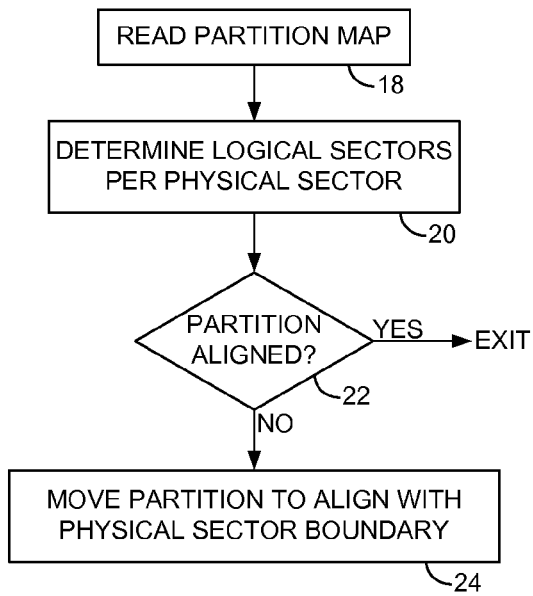
FIG. 2A is a flow diagram according to an embodiment of the present invention wherein when at least part of a partition is not aligned with the physical data sectors, at least part of the partition is moved to achieve a desired alignment.

FIG. 2A is a flow diagram illustrating a method according to an embodiment of the present invention of aligning a partition of a data storage device to a boundary of a physical data sector. The data storage device comprises a non-volatile memory comprising a plurality of physical data sectors, wherein each physical data sector comprises a plurality of logical data sectors. A partition map is read from the non-volatile memory (step 18), wherein the partition map identifies a partition comprising a number of logical data sectors. A number of logical data sectors in each physical data sector is determined (step 20). Whether at least part of the partition aligns with a boundary of a physical data sector is determined (step 22). When at least part of the partition does not align with a boundary of a physical data sector, at least part of the partition is moved to align at least part of the partition to a boundary of a physical data sector (step 24).

In one embodiment, moving at least part of a partition to align at least part of the partition to the boundary of a physical data sector helps reduce the need to perform read-modify-write operations when executing a write command. For example, if a file in a partition is written in a block of logical sectors (referred to as a cluster), and the clusters are aligned to a boundary of a physical data sector (and the cluster size is an integer multiple of physical data sectors), each write command to a file will write an integer number of physical data sectors thereby avoiding the need to perform a read-modify-write of a physical data sector.

Any suitable technique may be employed to determine the number of logical data sectors in each physical data sector in step 20 of FIG. 2A. In one embodiment, the data storage device operates according to the Advanced Technology Attachment (ATA) standard wherein the IDENTIFY DEVICE command may be issued which returns the number of logical data sectors per physical data sector.

Any suitable technique may also be employed to determine whether a partition is aligned to the boundary of a physical data sector. In one embodiment, the starting LBA of the partition is evaluated to determine whether it aligns with the boundary of a physical data sector. For example, in one embodiment the first LBA of the data storage device is mapped to the first physical data sector with zero offset such that the starting LBA of the partition aligns with a boundary of a physical data sector if the modulo division of the starting LBA by the number of logical data sectors per physical data sector is zero (i.e., if the starting LBA is an integer multiple of the number of logical data sectors per physical data sectors). If the first LBA is offset within the first physical data sector, the number of logical data sectors in the first physical data sector is first subtracted from the starting LBA, and the result is modulo divided by the number of logical data sectors per physical data sectors.

In one embodiment, the partition comprises system data including a file system identifying a number of system files and user files. The file system specifies an allocation block size (cluster size) for accessing a file (write/read), wherein the cluster size is a number of logical sectors. When a new file is created, at least one cluster is allocated to the file, and as the size of the file increases, additional clusters are allocated to the file. In one embodiment, if the cluster size is not an integer multiple of the number of logical data sectors per physical data sector, the alignment method is aborted since it may not help reduce the number of read-modify-write operations as described above.

Figure 2B:
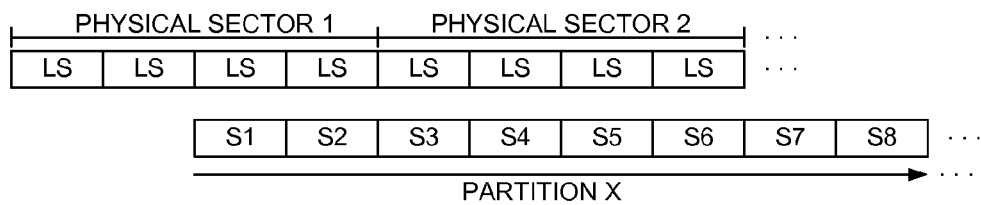
FIG. 2B illustrates an embodiment of the present invention wherein at least part of a partition is not aligned with the boundary of a physical data sector.
Figure 2C:
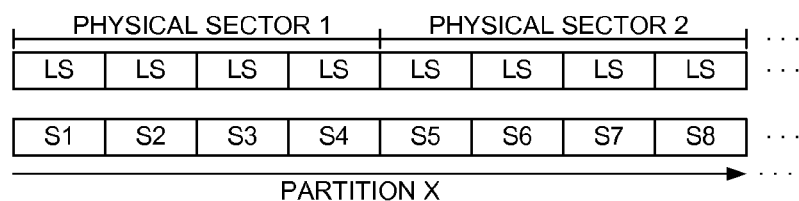
FIG. 2C illustrates an embodiment of the present invention wherein at least part of the partition is moved backward in order to align at least part of the partition to a boundary of a physical data sector.
Figure 2D:
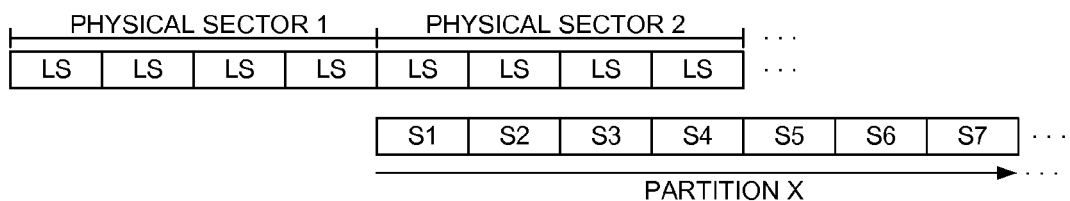
FIG. 2D illustrates an embodiment of the present invention wherein at least part of the partition is moved forward in order to align at least part of the partition to a boundary of a physical data sector.

FIG. 2B illustrates an example miss-alignment of a partition with respect to the physical data sectors. In this example, each physical data sector comprises four logical data sectors, wherein the first logical data sector of the partition is not aligned with a boundary of a physical data sector. FIG. 2C illustrates an embodiment of the present invention wherein the partition is moved backward by moving logical data sectors within the partition backward by two logical data sectors. In this manner, the first logical data sector of the partition aligns with the first logical data sector of the first physical data sector. In an alternative embodiment shown in FIG. 2D, logical data sectors within the partition may be moved forward so that the first logical data sector of the partition aligns with the first logical data sector of the second physical data sector.

Figures 3, 4A, 4B:
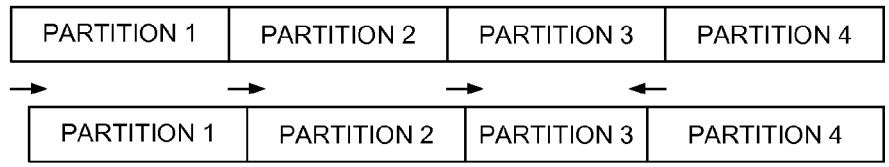
FIG. 3 illustrates an embodiment of the present invention wherein certain partitions are moved forward, and another partition is moved backward in order to align the partitions to the boundaries of physical data sectors.
FIG. 4A illustrates steps involved with aligning at least part of a partition according to an embodiment of the present invention.
FIG. 4B illustrates steps involved with resuming an alignment operation if it is interrupted (e.g., due to a power failure) according to an embodiment of the present invention.

FIG. 3 shows an embodiment wherein at least part of the first three partitions are moved forward and at least part of the fourth partition is moved backward. FIG. 3 also illustrates an embodiment wherein the size of a partition may be changed during the alignment operation, such as decreasing the size of the third partition in FIG. 3, or increasing the size of the fourth partition. In one embodiment, when the size of a partition is modified it's partition map and file system information that identifies the number of clusters available to allocate to files are modified accordingly.

FIG. 3 illustrates that in one embodiment one or both ends of a partition may be moved (forward or backward) in order to align the partitions to a boundary of a physical data sector. In another embodiment, a part of a partition may be moved within a partition without moving the beginning or end of a partition. For example, in one embodiment, the part of a partition for storing system and user data files is moved so that only the file data are aligned with the boundaries of the physical data sectors.

FIG. 4A shows a format of a partition according to an embodiment of the present invention comprising system data including a file system followed by a file data segment for storing the system and user data files. In one embodiment, in order to align a partition to a boundary of a physical data sector, at least part of the file data segment is moved within the partition without moving the system data. For example, one or more clusters of one or more files may be moved in order to align one or more clusters to a boundary of a physical data sector. This embodiment may help avoid catastrophic data loss of the system data in the event of a power failure while executing the alignment procedure. In the example shown in FIG. 4A, the file data segment comprises an unused area which can be used to move the system and user data files. If the unused areas are dispersed throughout the file data segment (e.g., when files are deleted), the alignment procedure may move only a portion of the file data segment until enough unused data sectors (or clusters) have been encountered. In this embodiment, the size of the file data segment in the file system may need to be adjusted since moving all or part of the file data segment may reduce the number of available clusters.

Figure 5A:
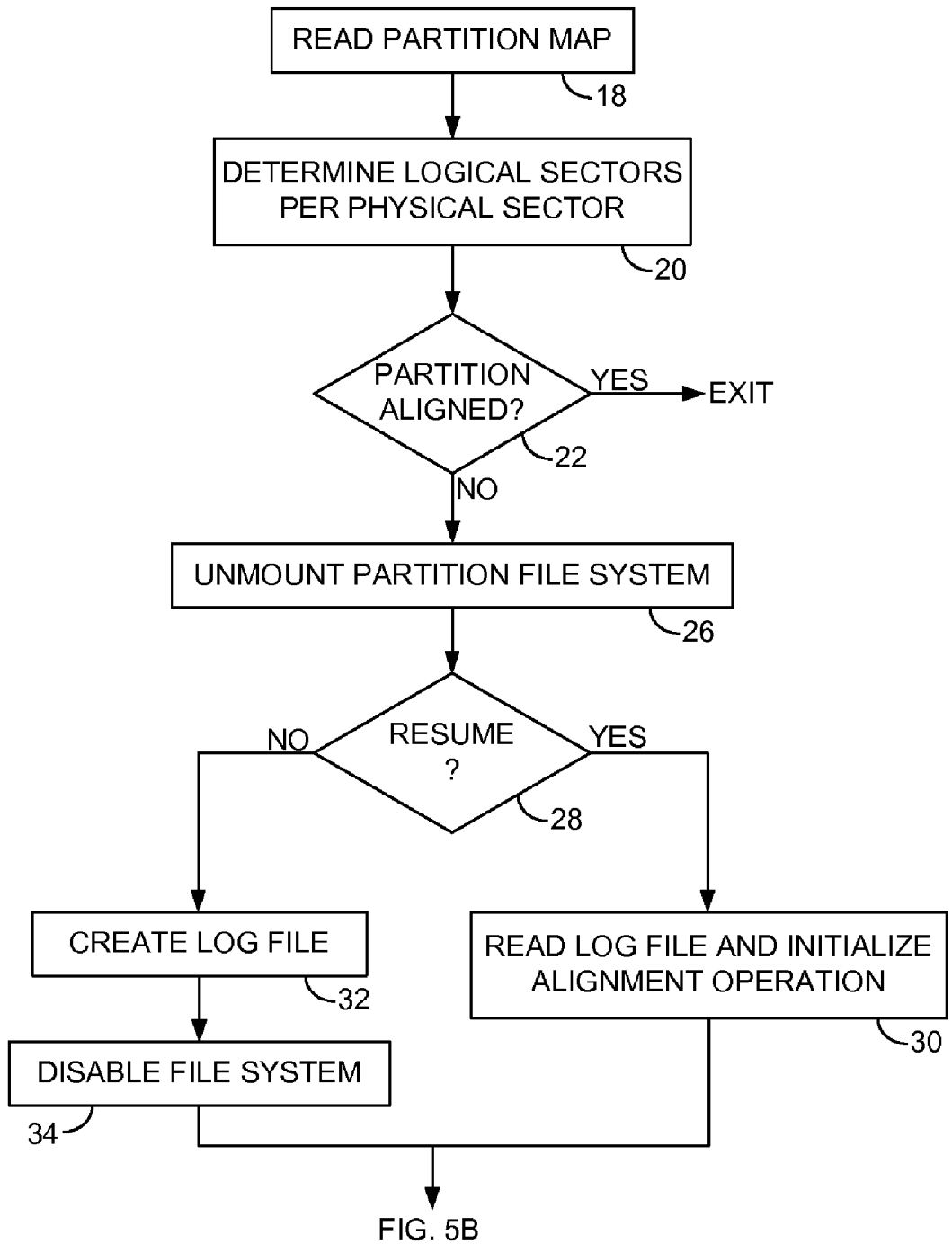
FIGS. 5A and 5B show a flow diagram according to an embodiment of the present invention for aligning at least part of a partition to a boundary of a physical data sector.

In another embodiment, one or more elements of the file system within the partition may be aligned to a boundary of a physical data sector. Example elements of a file system that may be aligned include all or part of a File Allocation Table (FAT) of a Windows file system, B-tree of a Mac file system, inodes of a Unix file system, allocation bit map, etc. Depending on the implementation, the elements of the file system may be aligned with or without moving the boundaries (beginning and/or end) of the partition, FIG. 4A illustrates an embodiment of the present invention for moving at least part of a partition to align the partition to a boundary of a physical data sector which is understood with reference to the flow diagram of FIG. 5A. In this embodiment, when a partition is not aligned (step 22), the file system for the partition is unmounted (step 26) to prevent other applications from accessing the file system during the alignment operation. A check is done (step 28) to determine whether a prior alignment operation on the partition was interrupted (e.g., by a power failure). An interruption may be detected by evaluating a log file maintained by the alignment operation, or by detecting a modification to the partition map, or any other suitable technique. If a prior alignment operation was interrupted, a log file maintained by the alignment operation is read in order to initialize the current alignment operation (step 30). If a prior alignment operation was not interrupted, a log file is created (step 32) and used to track the status of the alignment operation. In the embodiment shown in FIG. 4A, the log file (LF) is maintained in an unused area of the file data segment, preferably beyond the system and user data files.

Referring again to FIG. 5A, in one embodiment host access to the partition's file system is disabled (step 34) to prevent the host from accessing the file system before the alignment operation has completed. In this embodiment, if a power failure interrupts an alignment procedure, the host is prevented from accessing the partition's file system because it is in an unknown state. The partition's file system may be disabled at step 34 using any suitable technique. In one embodiment, the alignment operation disables the partition's file system by changing the file system type field in the partition map (FIG. 1D) to a value that will not be recognized by the host. In one embodiment, the alignment utility running on the host may recognize the modified file type so that the alignment utility can access the log file stored in the file system. Alternatively, the log file may be stored in the file system of a different partition, or on a different storage device.

Figure 5B:
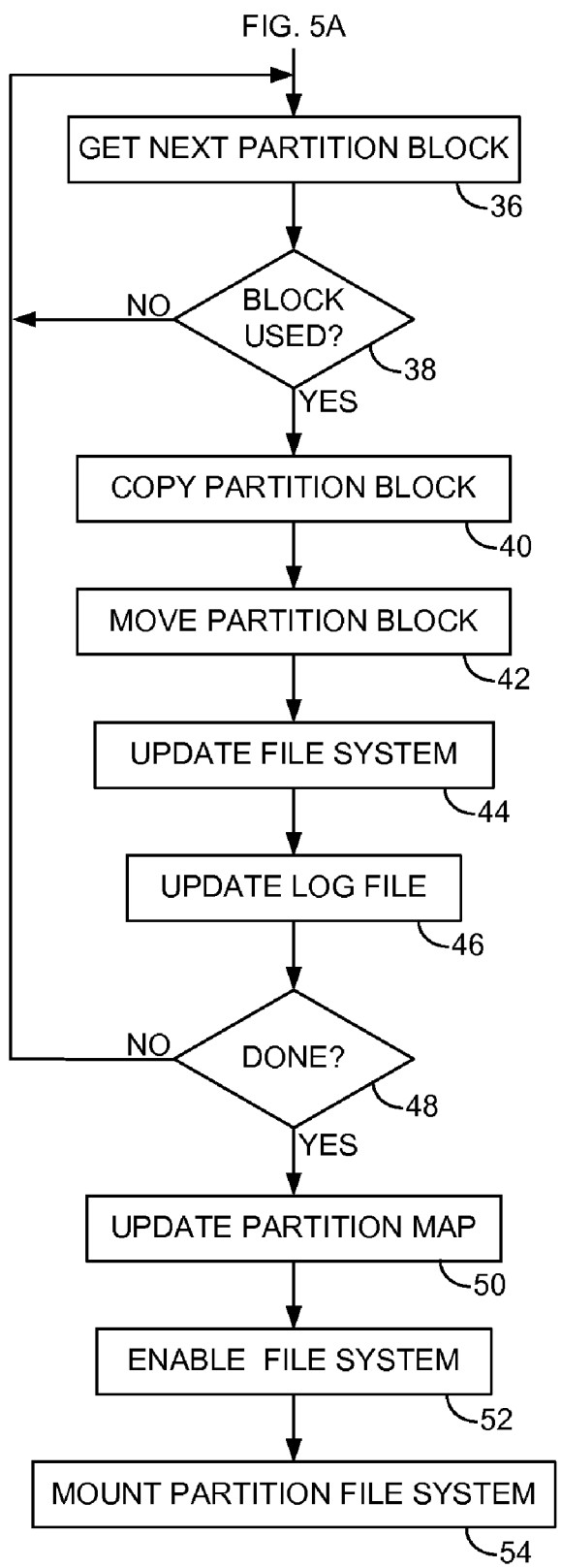

FIG. 5B illustrates an embodiment for block moving at least part of the partition (e.g., using a block copy command). The next block to move is determined (step 36) and evaluated to determine whether it is being used (e.g., allocated to a system or user file). If the current block is not being used (step 38), it is skipped and the next block to move is determined. When a used block is found, a copy of the partition block is stored in an unallocated block of the unused area of the file data (step 40). FIG. 4A shows an example wherein a copy of block 1 is made. The block is then moved (step 42) (e.g., block 1 is moved forward in FIG. 4A), the file system is updated to reflect the move (step 44), and the log file is updated (step 46) to update the status of the alignment operation.

The steps of FIG. 5B are repeated (step 48) until the partition (or part of the partition) has been aligned to a boundary of a physical data sector. If a boundary of the partition changed, or a size of the partition changed during the alignment procedure, the partition map is updated accordingly (step 50). The file system is then enabled for host access (step 52), for example, by restoring the file system type in the partition map, and the file system is mounted (step 54).

FIG. 4B illustrates an embodiment of the present invention for recovering a corrupted block due to the alignment operation being interrupted by a power failure. In this example, a power failure occurred while moving block 2 and therefore block 2 may be corrupted. When the alignment procedure resumes, the log file (LF) is evaluated to determine which block was being moved when the power failure occurred. The copy of the block stored in the unused area is then used to re-execute the move of block 2 as illustrated in FIG. 4B.

The flow diagrams disclosed herein may be carried out by a microprocessor executing code segments of a program stored on a computer readable medium. Any suitable computer readable storage medium capable of storing code segments may be employed, such as the data storage device being aligned, or a separate data storage device, such as a disk drive, or a flash memory, or a CD.

Figure 6A:
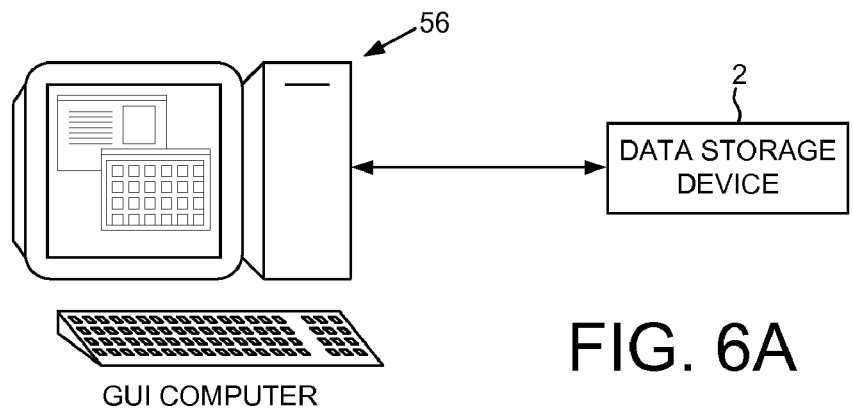
FIG. 6A illustrates an embodiment of the present invention wherein a utility program comprising code segments stored on a computer readable medium are executed by a host computer system in order to align a partition of a data storage device.
Figure 6B:
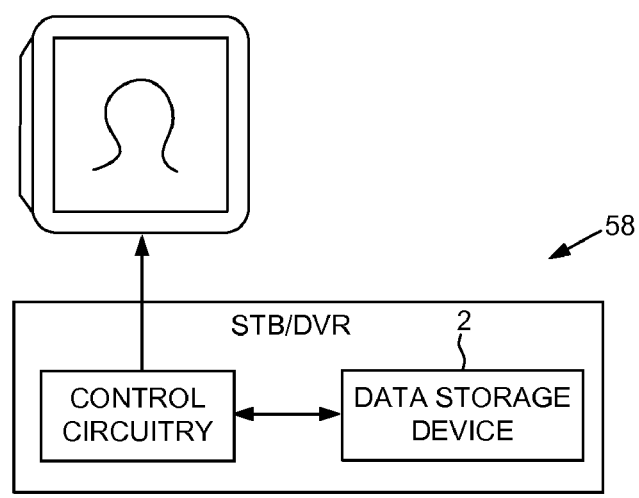
FIG. 6B illustrates an embodiment of the present invention wherein the program for performing the alignment operation is executed by control circuitry within a set-top-box or digital video recorder.
Figure 6C:
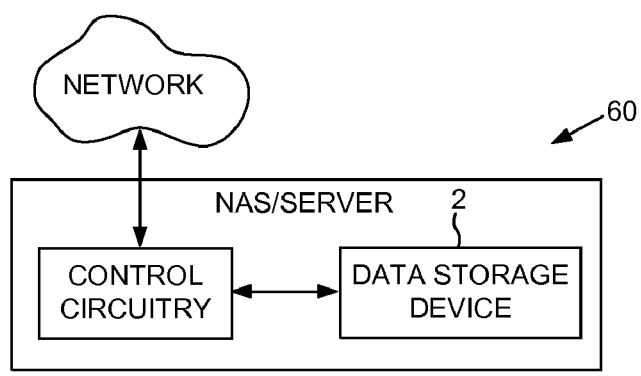
FIG. 6C illustrates an embodiment of the present invention wherein the program for performing the alignment operation is executed by control circuitry of a network attached storage device or server connected to a network such as the Internet.

In one embodiment, the control circuitry 4 within the data storage device 2 being aligned (FIG. 1A) may execute the alignment program. In another embodiment shown in FIG. 6A, a computer system 56 aligns a partition of a data storage device connected internally or externally. FIG. 6B shows an embodiment wherein the control circuitry of a set-top-box or digital video recorder 58 executes the alignment program, and FIG. 6C shows an embodiment wherein the control circuitry of a network attached storage device or a server connected to a network (e.g., the Internet) executes the alignment program.

Figure 7:
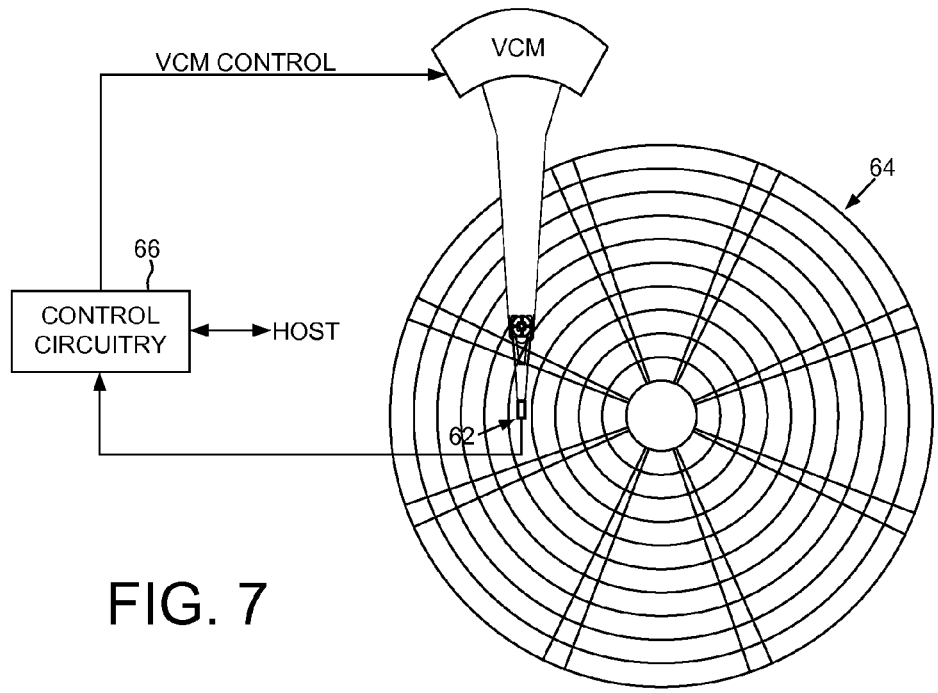
FIG. 7 illustrates an embodiment of the present invention wherein the data storage device comprises a disk drive.

The embodiments of the present invention may be used to align a partition of any suitable data storage device. FIG. 7 shows a data storage device in the form of a disk drive comprising a head 62 actuated over a disk 64 having a plurality of tracks. The disk drive further comprises control circuitry 66 for receiving access commands from a host (write/read commands) and for generating a control signal applied to a voice coil motor (VCM) to rotate an actuator arm about a pivot in order to position the head 62 radially over the disk 64 to access a target track. Each track is divided into a number of physical data sectors, wherein each physical data sector comprises a plurality of logical data sectors.

Figure 8:
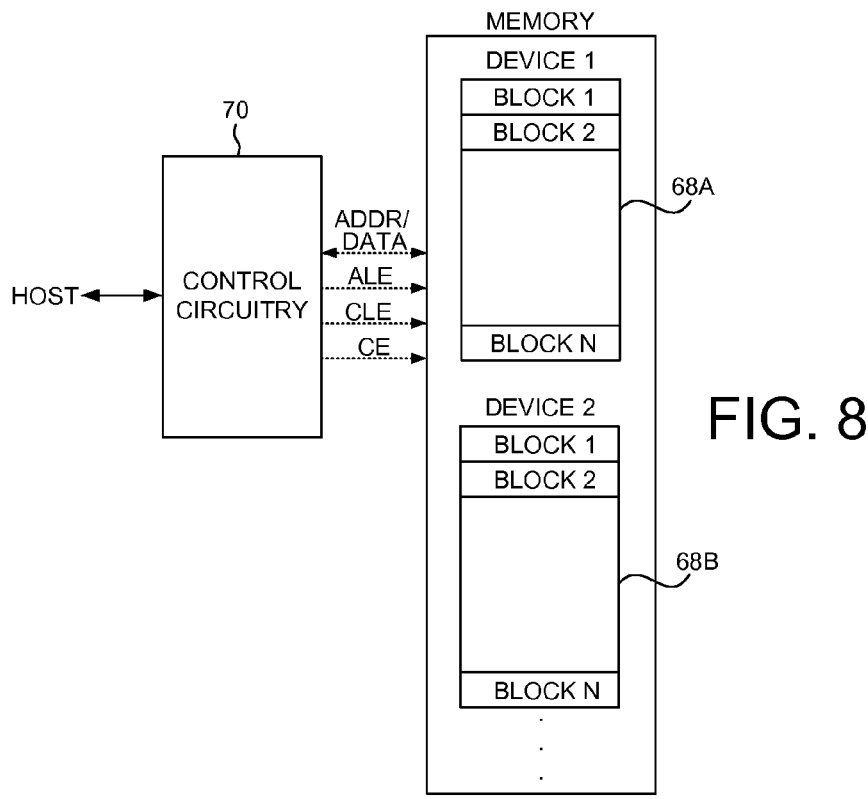
FIG. 8 illustrates an embodiment of the present invention wherein the data storage device comprises a solid state drive.

FIG. 8 shows a data storage device in the form of solid state drive comprising a plurality of non-volatile semiconductor memories 68A, 68B, etc., such as flash memories, and control circuitry 70 for accessing the non-volatile semiconductor memories. In one embodiment, the physical data sector of the solid state drive corresponds to a page of memory in a memory array, wherein each page stores a plurality of logical data sectors. A hybrid data storage device may also be employed comprising components of a disk drive shown in FIG. 7 combined with the non-volatile semiconductor memories shown in FIG. 8.

Although the foregoing has been described in terms of certain embodiments, other embodiments will be apparent to those of ordinary skill in the art from the disclosure herein. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

What is claimed is:

1. A method of aligning a partition of a data storage device to a boundary of a physical data sector, the data storage device comprising a non-volatile memory comprising a plurality of physical data sectors, wherein each physical data sector comprises a plurality of logical data sectors, the method comprising:
    reading a partition map from the non-volatile memory, wherein the partition map identifies at least one partition comprising a number of logical data sectors;
    determining a number of logical data sectors in each physical data sector;
    determining whether at least part of the partition aligns with a boundary of a physical data sector; and
    when at least part of the partition does not align with a boundary of a physical data sector, moving at least part of the partition to align at least part of the partition to a boundary of a physical data sector.

2. The method as recited in claim 1, wherein at least part of the partition is moved backward by at least one logical data sector.

3. The method as recited in claim 1, wherein at least part of the partition is moved forward by at least one logical data sector.

4. The method as recited in claim 1, wherein when at least part of the partition does not align with a boundary of a physical data sector, further comprising changing the number of logical data sectors in the partition.

5. The method as recited in claim 1, further comprising updating the partition map to reflect the modification to the partition.

6. The method as recited in claim 1, further comprising maintaining a log file for tracking a state of moving at least part of the partition.

7. The method as recited in claim 1, wherein the partition comprises a file system.

8. The method as recited in claim 7, further comprising modifying system data to disable host access to the file system.

9. The method as recited in claim 7, wherein moving at least part of the partition comprises:
    copying a block of the partition;
    moving the block of the partition; and
    updating the file system to reflect the moved block.

10. The method as recited in claim 9, further comprising skipping blocks which are unused by the file system.

11. The method as recited in claim 6, wherein if the step of moving is interrupted, further comprising reading status information from the log file to resume the step of moving.

12. The method as recited in claim 9, wherein if the step of moving is interrupted, further comprising reading the copy of the block to resume the step of moving.

13. The method as recited in claim 1, wherein:
the partition comprises file data; and
the step of moving at least part of the partition comprises moving at least part of the file data within the partition.

14. The method as recited in claim 13, wherein:
the file data is accessed in clusters; and
the step of moving at least part of the file data comprises moving at least one cluster.

15. The method as recited in claim 7, further comprising updating the file system to reflect moving at least part of the partition.

16. The method as recited in claim 7, wherein the step of moving at least part of the partition comprises moving an element of the file system.

17. A system comprising control circuitry operable align a partition of a data storage device to a boundary of a physical data sector, wherein the data storage device comprises a non-volatile memory comprising a plurality of physical data sectors, and each physical data sector comprises a plurality of logical data sectors, the control circuitry operable to perform the steps of:
reading a partition map from the non-volatile memory, wherein the partition map identifies at least one partition comprising a number of logical data sectors;
determining a number of logical data sectors in each physical data sector;
determining whether at least part of the partition aligns with a boundary of a physical data sector; and
when at least part of the partition does not align with a boundary of a physical data sector, moving at least part of the partition to align at least part of the partition to a boundary of a physical data sector.

18. The system as recited in claim 17, wherein at least part of the partition is moved backward by at least one logical data sector.

19. The system as recited in claim 17, wherein at least part of the partition is moved forward by at least one logical data sector.

20. The system as recited in claim 17, wherein when at least part of the partition does not align with a boundary of a physical data sector, the control circuitry operable to perform the step of changing the number of logical data sectors in the partition.

21. The system as recited in claim 17, wherein the control circuitry operable to perform the step of updating the partition map to reflect the modification to the partition.

22. The system as recited in claim 17, wherein the control circuitry operable to perform the step of maintaining a log file for tracking a state of moving at least part of the partition.

23. The system as recited in claim 17, wherein the partition comprises a file system.

24. The system as recited in claim 23, wherein the control circuitry operable to perform the step of modifying system data to disable host access to the file system.

25. The system as recited in claim 23, wherein moving at least part of the partition comprises:
copying a block of the partition;
moving the block of the partition; and
updating the file system to reflect the moved block.

26. The system as recited in claim 25, wherein the control circuitry operable to perform the step of skipping blocks which are unused by the file system.

27. The system as recited in claim 22, wherein if the step of moving is interrupted, the control circuitry operable to perform the step of reading status information from the log file to resume the step of moving.

28. The system as recited in claim 25, wherein if the step of moving is interrupted, the control circuitry operable to perform the step of reading the copy of the block to resume the step of moving.

29. The system as recited in claim 17, wherein:
the partition comprises file data; and
the step of moving at least part of the partition comprises moving at least part of the file data within the partition.

30. The system as recited in claim 29, wherein:
the file data is accessed in clusters; and
the step of moving at least part of the file data comprises moving at least one cluster.

31. The system as recited in claim 23, wherein the control circuitry operable to perform the step of updating the file system to reflect moving at least part of the partition.

32. The system as recited in claim 23, wherein the step of moving at least part of the partition comprises moving an element of the file system.

33. A computer readable medium for storing code segments of a program for aligning a partition of a data storage device to a boundary of a physical data sector, the data storage device comprising a non-volatile memory comprising a plurality of physical data sectors, wherein each physical data sector comprises a plurality of logical data sectors, the code segments operable to perform the steps of:
reading a partition map from the non-volatile memory, wherein the partition map identifies at least one partition comprising a number of logical data sectors;
determining a number of logical data sectors in each physical data sector;
determining whether at least part of the partition aligns with a boundary of a physical data sector; and
when at least part of the partition does not align with a boundary of a physical data sector, moving at least part of the partition to align at least part of the partition to a boundary of a physical data sector.

* * * * *